United States Patent
Augenstein et al.

(10) Patent No.: US 7,366,625 B1
(45) Date of Patent: Apr. 29, 2008

(54) METHOD, APPARATUS AND COMPUTER MEDIUM FOR CORRECTING TRANSIENT FLOW ERRORS IN FLOWMETER PROVING DATA

(75) Inventors: Donald R. Augenstein, Pittsburgh, PA (US); Herbert Estrada, Annapolis, MD (US); Matthew Mihalcin, Pittsburgh, PA (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 11/542,710

(22) Filed: Oct. 4, 2006

(51) Int. Cl.
  *G06F 19/00* (2006.01)
(52) U.S. Cl. ........................ 702/100; 702/85
(58) Field of Classification Search ............... 702/100, 702/85
  See application file for complete search history.

(56) References Cited

U.S. PATENT DOCUMENTS 3,457,768 A * 7/1969 Jasek ..................... 73/1.23
4,831,866 A * 5/1989 Forkert et al. ............. 73/1.27

OTHER PUBLICATIONS

Meng, J; Zu, L; Liang, D; Liang, X; "Adaptive Frequency Measurement (AFM) for Vortex Flowmeter Signal"; Proceedings 1992 IEEE International Symposium on Industrial Electronics; vol. 2; May 25-29 1992; pp. 832-835.*

* cited by examiner

*Primary Examiner*—John Barlow
*Assistant Examiner*—Douglas N Washburn
(74) *Attorney, Agent, or Firm*—Ansel M. Schwartz

(57) ABSTRACT

An apparatus for increasing the accuracy of meter factors of a flow instrument in conjunction with a prover having upstream and downstream prover detection switches and a flow computer including a computer program embodied on a computer readable medium for correcting errors in a meter factor of the flow instrument measured in a proving run and correcting effects of flow rate changes during proving. A computer program embodied on a computer readable medium whose contents causes a processor to increase the accuracy of meter factors of a flow instrument in conjunction with a prover having upstream and downstream prover detection switches and a flow computer. A method for increasing the accuracy of the meter factors of a flow instrument in conjunction with a prover having upstream and downstream prover detection switches and a flow computer.

25 Claims, 8 Drawing Sheets

METHOD, APPARATUS AND COMPUTER MEDIUM FOR CORRECTING TRANSIENT FLOW ERRORS IN FLOWMETER PROVING DATA

FIELD OF THE INVENTION

In accordance with certain embodiments, the present invention is related to the ability to "prove" transit time ultrasonic flowmeters as well as meters based on other technologies, using any standard but particularly using small volume provers.

BACKGROUND OF THE INVENTION

Small volume provers are used extensively in the petroleum industry as a means to prove custody transfer meters-meters that account the volume of product delivered from one party to another. (See the American Petroleum Institute (API) Manual of Petroleum Measurement Standards, Chapter 4, Section 3 for a description of the design of small volume provers.) The proving process confirms or modifies the meter calibration through the application of a meter factor. It is carried out as follows:

Flow through the meter to be calibrated is also directed through the prover. The flow causes a piston or similar device within the prover to pass between two position detector switches. The product volume measured by the meter to be calibrated during the period between detector switch actuations is compared against the volume of the prover between the detector switches. (Prior to using the prover, the volume between detectors is measured using a standard volume container traceable in the US to NIST. In other countries the standard volume is traceable to other national standard laboratories.) The ratio of the prover volume to the uncorrected volume measured by the meter is the meter factor. Each such meter factor determination is referred to as a "proving run". Typically multiple proving runs are performed, and a meter factor for future operations is determined from the average of the individual prove measurements. The accuracy of the meter factor determination is enhanced by the use of multiple prove runs.

Proving transit time ultrasonic meters with small volume provers presents a problem that is inherent in the application of the technology to the measurement of fluid flow over a period of short duration. In order to understand this problem, it is useful first to describe, as an example, the operation of ultrasonic meters.

Transit time ultrasonic meters determine fluid velocity by measuring the transit times of pulses of ultrasonic energy traveling along clearly defined paths, with and against the direction of the flow. Ultrasonic meters used for custody transfer typically employ multiple paths, sometimes in a chordal arrangement, so that the multiple velocity measurements can be combined according to an appropriate algorithm to determine volumetric flow rate. A flow rate measurement is thus performed using a set of transit time measurements. In the majority of petroleum product flow measurements, the flow is turbulent, which means that local fluid velocities vary spatially and temporally about some average. As a result a single flow rate measurement, comprised of a set of chordal measurements, will not, in general, represent the true average flow rate present at that time, but may vary over a range of about ±2%. If many flow rate measurements are made, it will be found that they form a normal distribution, centered on the average flow rate and having a standard deviation of about 1%. The uncertainty of the mean of a normally distributed population of measurements is equal to the standard deviation of the distribution divided by the square root of the number of sample measurements taken from the population. The average of multiple measurements can therefore yield an accurate measure of the average flow rate prevailing during the time over which the measurements are made.

The contained volume of a small volume prover is, as the name implies, small; consequently the duration of a prove—the elapsed time between actuations of the first and second detector switches—is short, typically between k and 1 second. The rate at which transit time ultrasonic flowmeters sample the flow rate varies among manufacturers, but is usually between 5 and 100 Hz. Using a sample rate of 25 Hz as an example, the number of flow rate samples obtained during a 1 second prove will be 25. If, as described in the preceding paragraph, the individual sample measurements obtained during the prove vary randomly about the mean, in a normal distribution with a standard deviation of 1%, the uncertainty in the mean meter factor obtained during the prove is $1\%/(25)^{1/2} = \pm 0.2\%$ (one standard deviation). Put another way, the meter factors determined from repeated proves will be randomly distributed about the true mean in a distribution having a standard deviation of 0.2%. API standards for custody transfer require that the meter factor be determined with an accuracy of ±0.027% at a 95% confidence level, which is equivalent to two standard deviations. Application of statistical analyses shows that over 200 prover runs would be required to determine a meter factor with the requisite accuracy.

Coriolis and vortex shedding meters, as well as other meters whose instantaneous outputs fluctuate about the true flow are subject to similar constraints. Like ultrasonic meters, these meters create a pulse train representative of volume artificially, via a variable frequency oscillator whose frequency is set by the measured flow rate.

These discussions illustrate an important difference between the meters listed in the paragraph above and flow measurement devices traditionally used in the petroleum industry. As described above, ultrasonic flowmeters compute volumetric flow rate from a finite sample of velocities measured along acoustic paths whereas traditionally used instruments, specifically turbine meters and positive displacement meters, respond continuously to the flow field as a whole—the determination of volumetric flow is inherent in their principles of operation. Turbine meters and positive displacement meters are therefore less sensitive to turbulent variations and can usually be proved in a relatively small number of prover runs, even with a small volume prover.

Despite this advantage, turbine meters and positive displacement meters are gradually being replaced by ultrasonic meters because the maintenance costs of the latter meters, which have no moving parts, are far lower. Extensive testing by the API and others, using large provers and master meters, has demonstrated that transit time ultrasonic meters are capable of delivering an accuracy of ±0.027% in petroleum applications. There is therefore a significant incentive to find a way whereby they can be calibrated effectively with small volume provers.

To address the proving shortcomings of ultrasonic meters, designers have turned to filtering of the raw flow rate samples, processing multiple samples to form a "smoothed" flow rate measurement. Similar measures have been taken by designers of coriolis meters. In most instances, the signal processing amounts to a single time constant low pass filter. With ultrasonic meters time constants as short as 0.1 seconds or as long as 10 seconds may be employed. This practice has the effect of extending the proving period (because more prove samples are incorporated in the determination of flow during the prove). It has however a significant weakness: If the actual flow rate changes just before or during a proving run, the meter factor determined from the proving data will be biased by an amount dependent on the sign and magnitude of the flow change. (The subject of errors due to sample delays as well as smoothing time constants has been explored by an API Task Group. See "Proving Liquid Meters with Microprocessor Based Pulse Outputs", K. D. Elliot, North Sea Workshop, October, 2005, incorporated by reference herein.) The meter factor bias (which must be viewed as an error since it will not be detected) is shown as a function of the filter time constant in FIG. 1 for both step and ramp changes during a 1 second prove.

Some discussion of FIG. 1 is warranted. First, it should be noted that flow rate can and usually does change during a prove. The change is sometimes caused by the hydraulic resistance inserted by the prover itself in the flow circuit—in this case the bias produced by the flow change will be systematic and will not be removed by repeated proves. The API recognizes that flow changes can be a problem; changes can introduce errors in turbine meters as well as ultrasonic meters. Consequently, a 5% flow change during a prove is a generally accepted limit. Interpreting FIG. 1 on this basis: If a step change of 5% took place at the beginning of the prove of an ultrasonic meter having a 5 second time constant, the meter factor determined from the data of that prove would be in error by 0.9×5%=4.5%. This error is obviously far in excess of the ±0.027% allowable uncertainty in the meter factor (and the allowable uncertainty must also accommodate the prover uncertainty and the statistical variations in measured meter factor due to turbulence).

Even with shorter meter time constants the bias is significant. Suppose for example a meter employs a smoothing time constant of 0.1 seconds. FIG. 1 indicates that a step change of 5% during a 1 second prove of this meter would introduce an error of 0.1×5%=0.5%—still far outside the desired accuracy bound.

Existing Corrections to the Small Volume Proving Process

Because rotational speed of turbine and positive displacement meters is proportional to flow rate, the number of rotations produced by these meters during a proving run is a direct indication of the volume of fluid that has passed through them during the run. The rotors of these meters are equipped with a proximity detecting arrangement which produces a pulse train that allows the turns to be counted. In turbine meters the proximity devices are often affixed to each blade, so that fractions of a turn may be counted; similar measures may be taken with positive displacement meters. Despite these measures, the number of pulses produced by turbine meters and positive displacement meters during a small volume proving run may not be consistent with the precision requirement for the calibration: ±0.01%. Consequently, it is industry practice with small volume provers to employ double chronometry: a process which enhances the number of pulses measured by a fraction to achieve the requisite precision. (The principles of double chronometry are described in Chapter 5, section 6 of the API Manual of Petroleum Measurement Standards, previously cited.)

Specifically, the number of pulses measured is increased as follows:

$$N_1 = N_m (T_2/T_1) \qquad 1)$$

Here $N_1$ is the corrected number of pulses and is typically not an integer $N_m$ is the integer number of pulses measured during the prove by the meter to be calibrated $T_2$ is the time measured between the actuations of the upstream and downstream prover detection switches of the prover $T_1$ is the time measured from the leading edge of the first pulse produced following the actuation of the upstream detector switch of the prover to the leading edge of the first pulse following the actuation of the downstream detector switch of the prover.

The meter factor, in volume per pulse, is then computed as the volume of the prover divided by $N_1$.

Because their operating principles lead to a flow rate measurement (as opposed to a volume measurement), ultrasonic flowmeters, as well as other meters that may benefit from the means disclosed herein, produce a pulse train representative of the volume of product passing through them by means of a controlled oscillator whose frequency is made proportional to the measured flow rate. Although the meter designer has some control over the frequency of the pulse train, it is rarely high enough to achieve the requisite precision during a prove of ½ to 1 second duration, so that double chronometry, as described above is applied to these meters also. (It should also be noted that the use of a frequency high enough to provide the requisite resolution may not be consistent with the capability of the flow computer which receives the pulses.)

The meter factor determination and the double chronometry correction functions typically are not performed in the meter being calibrated but are carried out in a flow computer which also controls the proving process and, during normal operation, corrects meter volumetric output to standard temperature and pressure conditions.

BRIEF SUMMARY OF THE INVENTION

In accordance with certain embodiments, the present invention pertains to an apparatus for increasing the accuracy of meter factors of a flow instrument in conjunction with a prover having upstream and downstream prover detection switches and a flow computer. The apparatus comprises a computer program for correcting errors in a meter factor measured in a proving run.

In accordance with further embodiments, the present invention pertains to computer readable medium whose contents causes a processor to increase the accuracy of meter factors of a flow instrument in conjunction with a prover having upstream and downstream prover detection switches and a flow computer, by performing the steps of receiving signals from the upstream and downstream prover detection switches and the flow instrument. There is the step of correcting errors in a meter factor measured in a proving run.

In accordance with yet further exemplary embodiments, the present invention pertains to a method for increasing the accuracy of the meter factors of a flow instrument in conjunction with a prover having upstream and downstream prover detection switches and a flow computer. The method comprises the steps activating a processor. There is the step of correcting errors in the meter factor measured in a proving run with a computer program in the processor.

BRIEF DESCRIPTION OF THE SEVERAL VIEWS OF THE DRAWING

In the accompanying drawings, exemplary embodiment of the invention and exemplary methods of practicing the invention are illustrated in which.

DETAILED DESCRIPTION OF THE INVENTION

Figure 1:
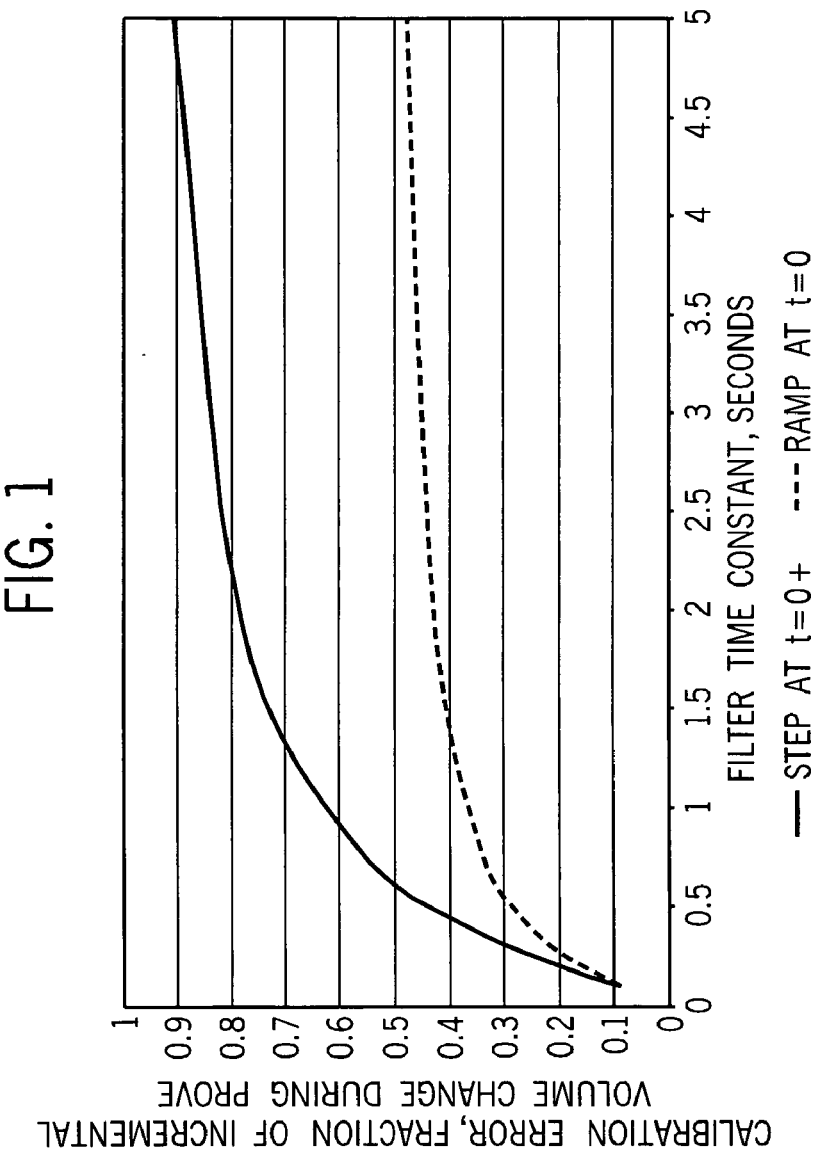
FIG. 1 is a draft of calibration error versus filter time constant.

Referring now to the drawings wherein like reference numerals refer to similar or identical parts throughout the several views, and more specifically to FIGS. 4-8 thereof, there is shown an apparatus 10 for increasing the accuracy of meter factors of a flow instrument 12 in conjunction with a prover 14 having upstream and downstream prover detection switches 16, 18 and a flow computer 20. The apparatus 10 comprises a computer program 22 for correcting errors in a meter factor measured in a proving run. The computer program 22 may be disposed in one or more tangible media, such as non-volatile or volatile memory, for example. Moreover, the computer program 22 may be effectuated through hardware, software, or any combination thereof.

The apparatus 10 can include a container 26 (see FIGS. 6 and 7) having a processor 24 and the program 22. Alternatively, the flow measuring instrument can include the program 22. Alternatively, the flow computer 20 includes the program 22. There is a memory 28 containing the program 22 in communication with the processor 24.

The program 22 can use a filter time constant which reduces the number of proving runs required to establish a meter factor within a specified accuracy. The program 22 can be used to detect flow rate changes prior to or during a proving run, which flow rate change would result in an unacceptable error in the meter factor determined by the proving run, whether or not the effect of the flow rate change is accounted in the meter factor determination. The program 22 can calculate the error produced by a flow rate change, taking into account signal processing, including data filtering, employed by the meter that measures the flow rate. The program 22 can correct the meter factor obtained by a proving run during which the flow rate changes by an amount that, without correction, would lead to an unacceptable error in the meter factor, such that the corrected meter factor has essentially no error.

The program 22 can correct error from a signal indicating the position of the upstream prover detection switch 16, a signal indicating the position of the downstream prover detection switch 18, a signal equal to the flow rate as measured and filtered by the meter to be proved, synchronized with the actuation of the upstream prover detection switch 16, a signal equal to the flow rate as measured and filtered by the meter to be proved, synchronized with the actuation of the downstream prover detection switch 18, an input equal to the value of a pulse train frequency/measured flow constant of the meter to be calibrated, and an input equal to the value of a time and a constant of the data filter employed by the meter being proved. The program 22 can correct error from a signal indicating the position of the upstream prover detection switch 16, a signal indicating the position of the downstream prover detection switch 18, an input equal to instantaneous pulse train frequencies synchronized with the actuations of the upstream and downstream prover detection switches 16, 18 an input equal to the value of a pulse train frequency/measured flow constant of the meter to be calibrated, and an input equal to the value of a time and a constant of the data filter employed by the meter being proved.

The program 22, in certain embodiments, employs an algorithm as follows:

$$N_{mc}=N_m+[\partial f/\partial Q \times (Q_b-Q_a) \times \tau].$$

Here $N_{mc}$ is the number of meter pulses produced during the proving run corrected for the filtering used by the ultrasonic (or other) meter.

$N_m$ is the integer number of pulses measured during the proving run, as previously defined.

$\partial f/\partial Q$ is the pulse frequency/flow rate constant employed by the meter.

$Q_b$ is the flow rate measured by the meter at the instant the downstream prover detection switch 18 is actuated.

$Q_a$ is the flow rate measured by the meter at the instant the upstream prover detection switch 16 is actuated.

$\tau$ is the time constant of the single pole low pass filter used to smooth the instantaneous flowmeter output.

In certain embodiments, the present invention pertains to computer readable medium whose contents causes a processor 24 to increase the accuracy of meter factors of a flow instrument 12 in conjunction with a prover 14 having upstream and downstream prover detection switches 16, 18 and a flow computer 20, by performing the steps of receiving signals from the upstream and downstream prover detection switches 16, 18 and the flow instrument 12. There is the step of correcting errors in a meter factor measured in a proving run.

In certain embodiments, the present invention pertains to a method for increasing the accuracy of the meter factors of a flow instrument 12 in conjunction with a prover 14 having upstream and downstream prover detection switches 16, 18 and a flow computer 20. The method comprises the steps activating a processor 24. There is the step of correcting errors in the meter factor measured in a proving run with a computer program 22 in the processor 24.

The activating step can include the step of activating the processor 24 in a container 26. Alternatively, the activating step includes the step of activating the processor 24 in the flow instrument 12. Alternatively, the activating step includes the step of activating the processor 24 in the flow computer 20.

The correcting step can include the step of correcting errors with the computer program 22 using a filter time constant which reduces the number of proving runs required to establish a meter factor within a specified accuracy. The correcting step can include the step of correcting errors with the computer program 22 that detects flow rate changes prior to or during a proving run, which flow rate change would result in an unacceptable error in the meter factor determined by the proving run, whether or not the effect of the flow rate change is accounted in the meter factor determination. The correcting step can include the step of correcting errors with the computer program 22 that calculates the error produced by a flow rate change, taking into account signal processing, including data filtering, employed by the meter that measures the flow rate. The correcting step can include the step of correcting errors with the computer program 22 that corrects the meter factor obtained by a proving run during which the flow rate changes by an amount that, without correction, would lead to an unacceptable error in the meter factor, such that the corrected meter factor has essentially no error.

The correcting step can include the steps of receiving a signal indicating the position of the upstream prover detection switch 16. There is the step of receiving by the processor 24 a signal indicating the position of the downstream prover detection switch 18. There is the step of receiving by the processor 24 a signal equal to the flow rate as measured and filtered by the meter to be proved, synchronized with the actuation of the upstream prover detection switch 16. There is the step of receiving by the processor 24 a signal equal to the flow rate as measured and filtered by the meter to be proved, synchronized with the actuation of the downstream prover detection switch 18. There is the step of receiving by the processor 24 an input equal to the value of a pulse train frequency/measured flow constant of the meter to be calibrated. There is the step of receiving by the processor 24 an input equal to the value of a time and a constant of the data filter employed by the meter being proved.

Theory for the Correction of UFM Calibration Data

As was noted above, ultrasonic meter designers usually process raw flow rate data through a smoothing filter, thereby reducing the effects of turbulence on their measurement. As was also noted, this process introduces errors in the meter factor measured in a proving run, if the flow changes during that run. This invention provides a technique effectively to correct these errors. The invention allows raw data to be filtered using time constants that significantly extend the effective duration of a proving run. It also eases substantially the requirement on the hydraulic circuit that flow rate be maintained constant during a proving run.

Specifically, certain embodiments of the invention correct proving data according to the following algorithm:

$$N_{mc} = N_m + [\partial f/\partial Q \times (Q_b - Q_a) \times \tau] \quad\quad 2)$$

Here $N_{mc}$ is the number of meter pulses produced during the proving run corrected for the filtering used by the ultrasonic (or other) meter.

$N_m$ is the integer number of pulses measured during the proving run, as previously defined.

$\partial f/\partial Q$ is the pulse frequency/flow rate constant employed by the meter.

$Q_b$ is the flow rate measured by the meter at the instant the downstream prover detection switch 18 is actuated.

$Q_a$ is the flow rate measured by the meter at the instant the upstream prover detection switch 16 is actuated.

$\tau$ is the time constant of the single pole low pass filter used to smooth the instantaneous flowmeter output.

The term in brackets [ ] in equation (2) is the correction count and is the preferred embodiment of this disclosure. The correction pulse count and/or count fraction is added or subtracted (depending on the sign of the $Q_b - Q_a$ term) to the pulses measured during the proving run, before applying the double chronometric correction of equation (3):

$$N_1 = N_{mc}(T_2/T_1) \quad\quad 3)$$

Here $N_1$, $T_2$ and $T_1$ have been defined following equation (1).

Figure 2:
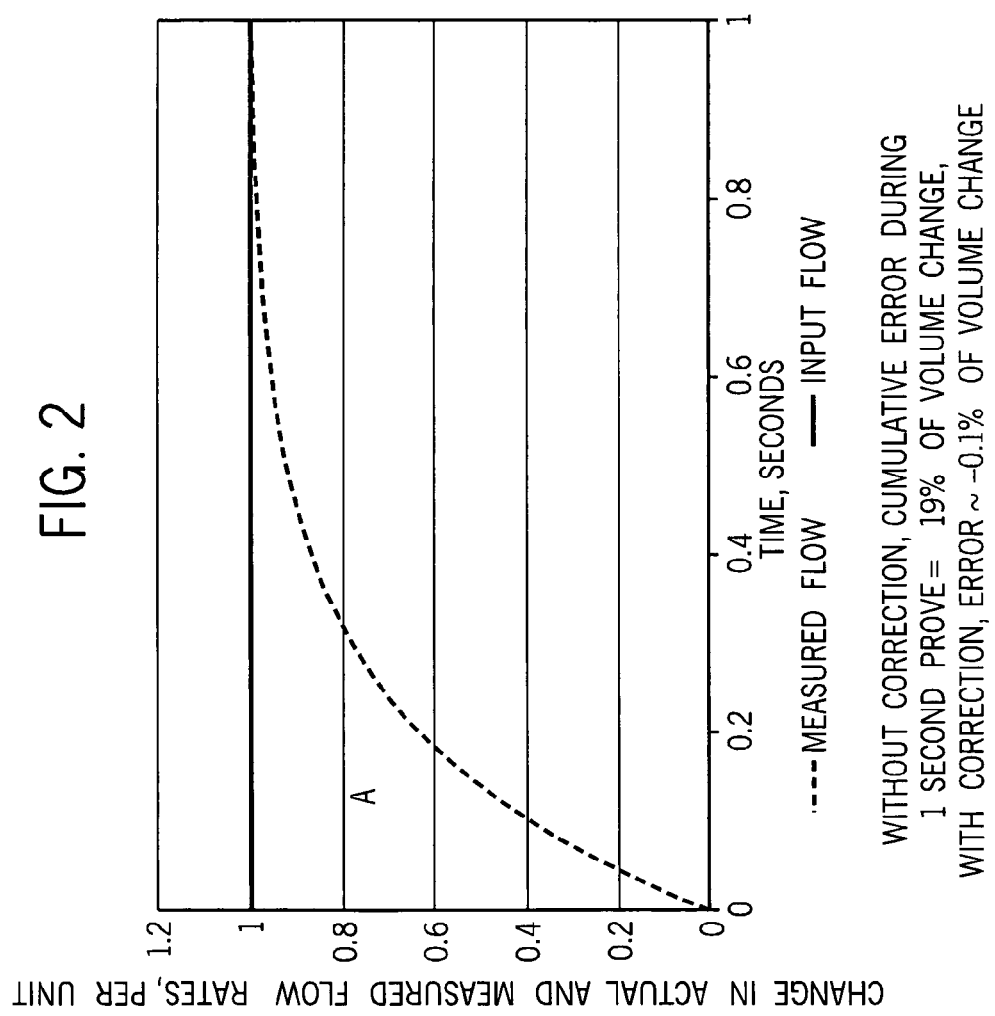
FIG. 2 is a graph of change in actual and measured flow rates versus time.

The theoretical basis underlying the invention can be understood by examining the response of an idealized measurement system whose output passes through a single pole low pass filter. FIG. 2 shows the response of a meter having a 0.2 second filtering time constant to an incremental step Δ in the actual flow, occurring just after the initiation of the prove. This transient, if negative, is roughly representative of the transient introduced by a prover 14 having more hydraulic resistance than the normal through-flow path.

The meter response to the step, $\Delta_m$ is described by an exponential function, specifically:

$$\Delta_m = \Delta(1 - e^{-t/\tau}) \quad\quad 4)$$

The proving error is the integral of the difference between the step and the exponential—the area A, bounded by the step and the rising output function. It may be shown that A is given by:

$$A = -\Delta\tau e^{-t/\tau} \text{ evaluated, for the 1 second prove, at } t=1 \text{ and at } t=0 \quad\quad 5)$$

Substituting $$A = -\Delta\tau(e^{1/\tau} - 1) = \Delta\tau(1 - e^{1/\tau}) \quad\quad 6)$$

But what is measured is not Δ but $\Delta_m$. At any time t, Δ can be expressed in terms of $\Delta_m$:

$$\Delta = \Delta_m/(1 - e^{t/\tau}) \quad\quad 7)$$

Thus A at t=1 is given by $$A = \Delta_m \tau \quad\quad 8)$$

This is exactly the correction term proposed herein. Note that on a theoretical basis, the correction works for a step disturbance regardless of the filter time constant relative to the prove time.

It should be noted that, because the ultrasonic flowmeter is a sample data system typically producing a digital output, the smoothing filter is likely to be digital. As a consequence, there may, in practice, be a small residual error in the correction whose magnitude is dependent on the flowmeter sample rate as against the filter time constant—the faster the sample rate relative to the time constant, the smaller the error. The small residual error shown for the corrected response in FIG. 2 is due to the sample rate used in the calculation; higher sample rates or longer time constants will lead to smaller residual errors. For example, the proposed correction for the same step, sampled at the same rate, will, with a 5 second filter, produce an error of only 0.02% of the volume change. Computer simulations demonstrate that the correction works regardless of the timing of the step relative to the initiation of the prove.

Figure 3:
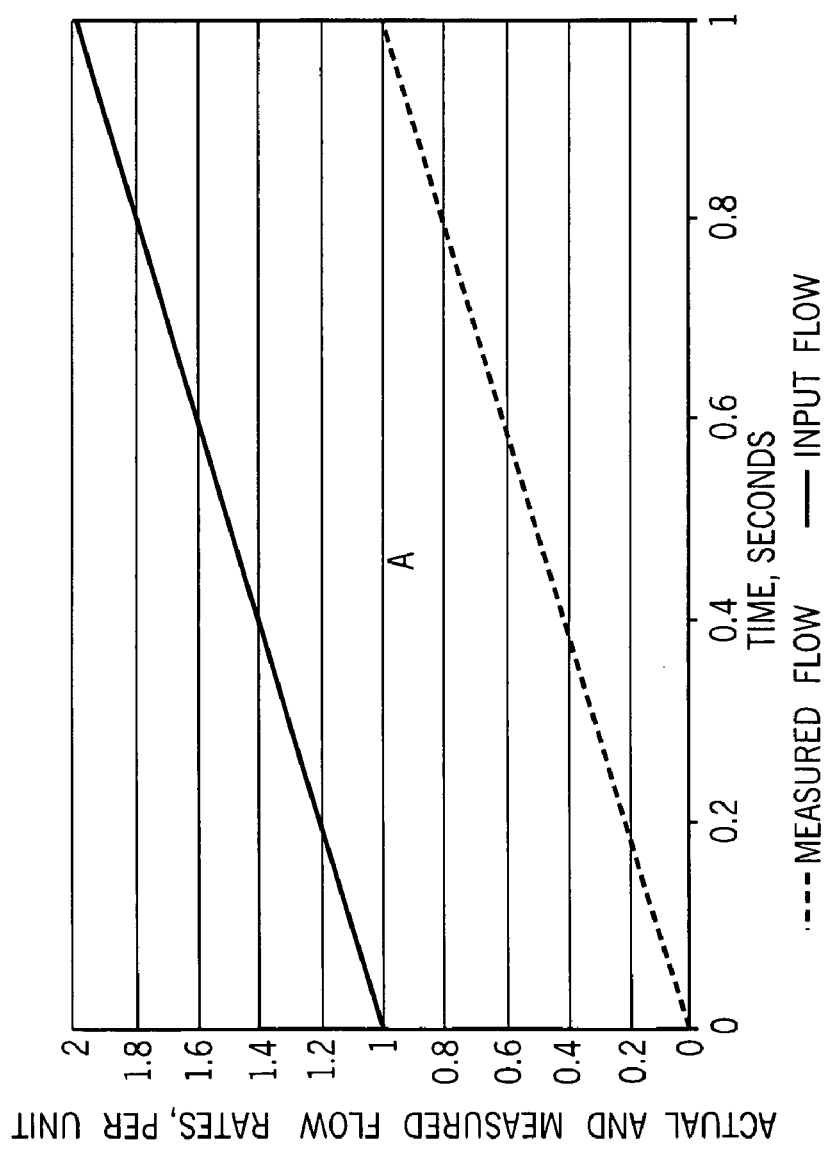
FIG. 3 is a graph of actual measured flow rates versus time.

The correction also works for ramp changes. FIG. 3 depicts the idealized response of a meter with a 1 second time constant to a 1 second prove to a ramp change of 1 per unit volume per second. For this example the ramp has been initiated 7 seconds before the prove begins. As theory predicts for times long after the initiation of the transient, the measured response is essentially parallel to the actual response, lagging behind it by a time given by the time constant τ, which in the case of FIG. 3 is 1 second.

Again the theoretical basis for the correction may readily be demonstrated. The discrepancy in the uncorrected output of the meter with a 1 second time constant is the area of the parallelogram bounded by the input flow, the measured flow, and the prove start and finish times (0 and 1 seconds in FIG.

3). This area represents the difference in the actual and measured volumes of the prove, $V_{act}$ and $V_{meas}$. Expressing these volumes algebraically:

$$V_{act}=[(Q_a+Q_b)/2](t_b-t_a) \quad (9)$$

$$V_{meas}=[(Q_{am}+Q_{bm})/2](t_b-t_a) \quad (10)$$

Here $Q_a$ and $Q_b$ are the actual flow rates at times $t_a$, the beginning of the prove, and $t_b$, the end of the prove. $Q_{am}$ and $Q_{bm}$ are the measured flow rates at these times.

The actual flow rate, Q, can be expressed algebraically as follows:

$$Q=Q_0+(dQ/dt)t \quad (11)$$

Here $Q_0$ is the value of the flow rate at the initiation of the transient, which occurs at t=0. The term (dQ/dt) is of course the slope of the ramp.

At the time of the prove, the measured flow, $Q_{meas}$, can be expressed as follows:

$$Q_{meas}=Q_0+(dQ/dt)(t-\tau) \quad (12)$$

From FIG. 3, it will be noted that the slopes of the ramps in actual and measured flow rates can be expressed as:

$$dQ/dt=(Q_b-Q_a)/(t_b-t_a)=(Q_{bm}-Q_{am})/(t_b-t_a) \quad (13)$$

The error in the volumetric measurement can be determined from the difference in actual and measured volumes (equations 9 and 10), using equations 11, 12, and 13.

14)

$$V_{act} - V_{meas} = \frac{1}{2}[(Q_a - Q_{am}) + ((Q_b - Q_{bm})](t_b - t_a)$$
$$= \frac{1}{2}\left[2\tau\left(\frac{dQ}{dt}\right)\right](t_b - t_a)$$
$$= \tau(Q_{bm} - Q_{am})$$

Thus, for the idealized ramp of FIG. 3, the error in the prove is exactly corrected by the proposed algorithm.

Simulations demonstrate that the correction works regardless of when the ramp is initiated relative to the initiation of the proving run. As with the step response, there may be a small residual error depending on the filter time constant and the sample rate. Again, if the sample rate is high relative to the proving time, the error is small and will diminish as the time constant increases. For example, computer simulations show that if the ramp is initiated simultaneously with the start of the prove, a filter time constant in the 0.1 to 0.2 second range, with a meter having a moderately fast sample rate, may produce an error, after correction, of 0.18% of the net volume change. If, for the same sample rate, the filter time constant is increased to 5 seconds, the net error after correction is 0.02% of the volume change.

Simulations of other disturbances, such as a pulse in flow rate during a proving run, show that the proposed algorithm effectively eliminates proving biases from these disturbances as well.

The analyses and descriptions of the present invention have used, as an example, a meter having a first order linear filter to remove unwanted fluctuations—noise—from the raw flow rate data. However, the same approach can be applied to correct the proving data for other filtering systems such as a sliding average filter. For alternative data filters the value of $\tau$ would be selected as appropriate to the specific filtering methodology used.

Implementation

Figure 4:
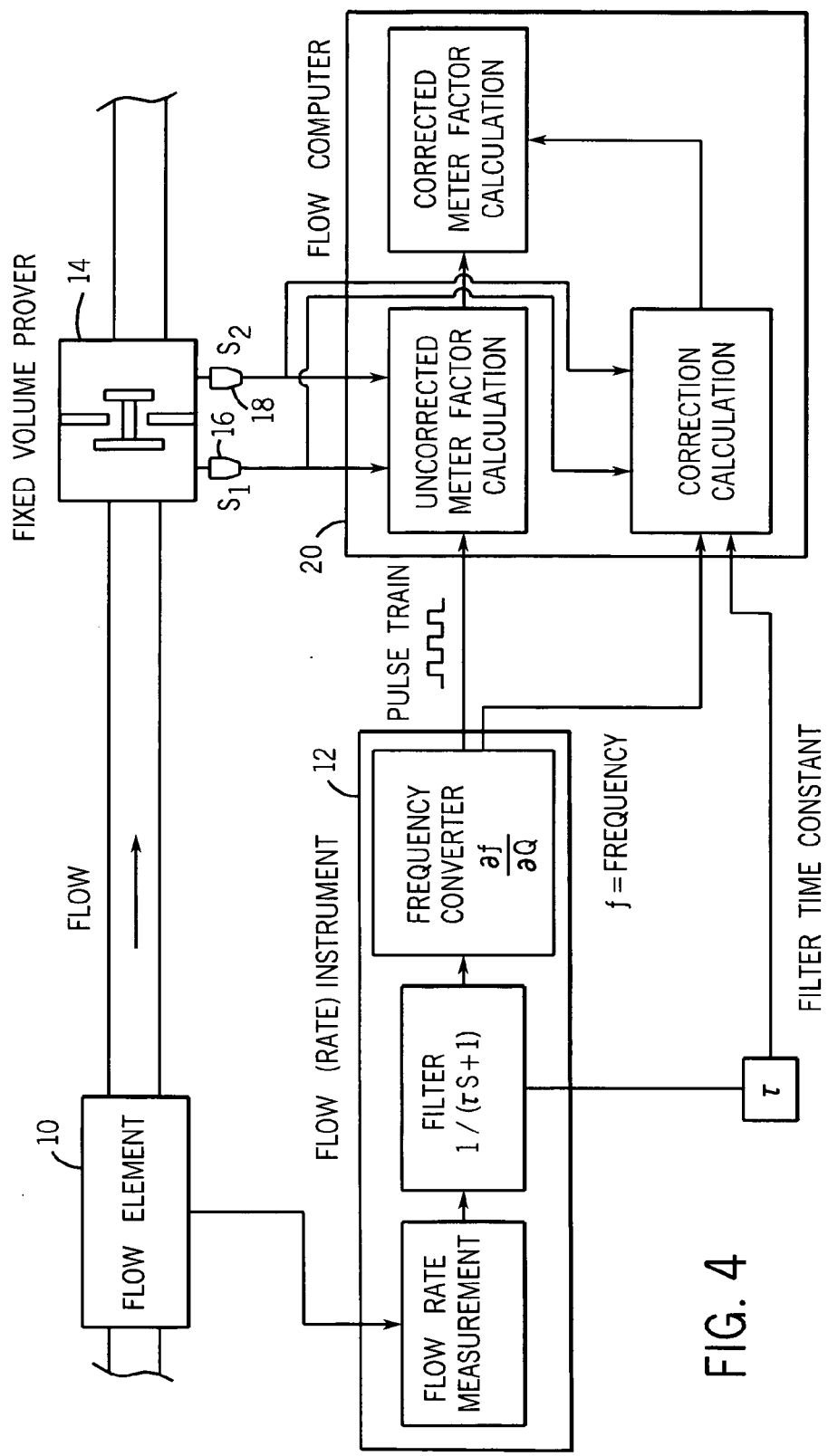
FIG. 4 is a block diagram of a first embodiment of the present invention.

The software and hardware to carry out the meter factor correction described herein may conveniently be located in the flow computer 20, which, as noted above, controls the proving process, and receives the prover 14 detector switch actuation signals and the volumetric pulse train from the meter to be calibrated. Uncorrected measured flow rates are also typically supplied to the flow computer 20, so that, if the meter manufacturer supplies the meter's frequency/flow rate constant ($\partial f/\partial Q$) and filter time constant, $\tau$, to the flow computer 20 manufacturer, the correction can readily be carried out in the flow computer 20. Alternatively, the flow computer 20 can calculate the correction from the instantaneous pulse train frequency, continuously supplied to the flow computer 20 from the meter to be calibrated, along with $\tau$. A diagram of this embodiment is shown in FIG. 4.

Figure 5:
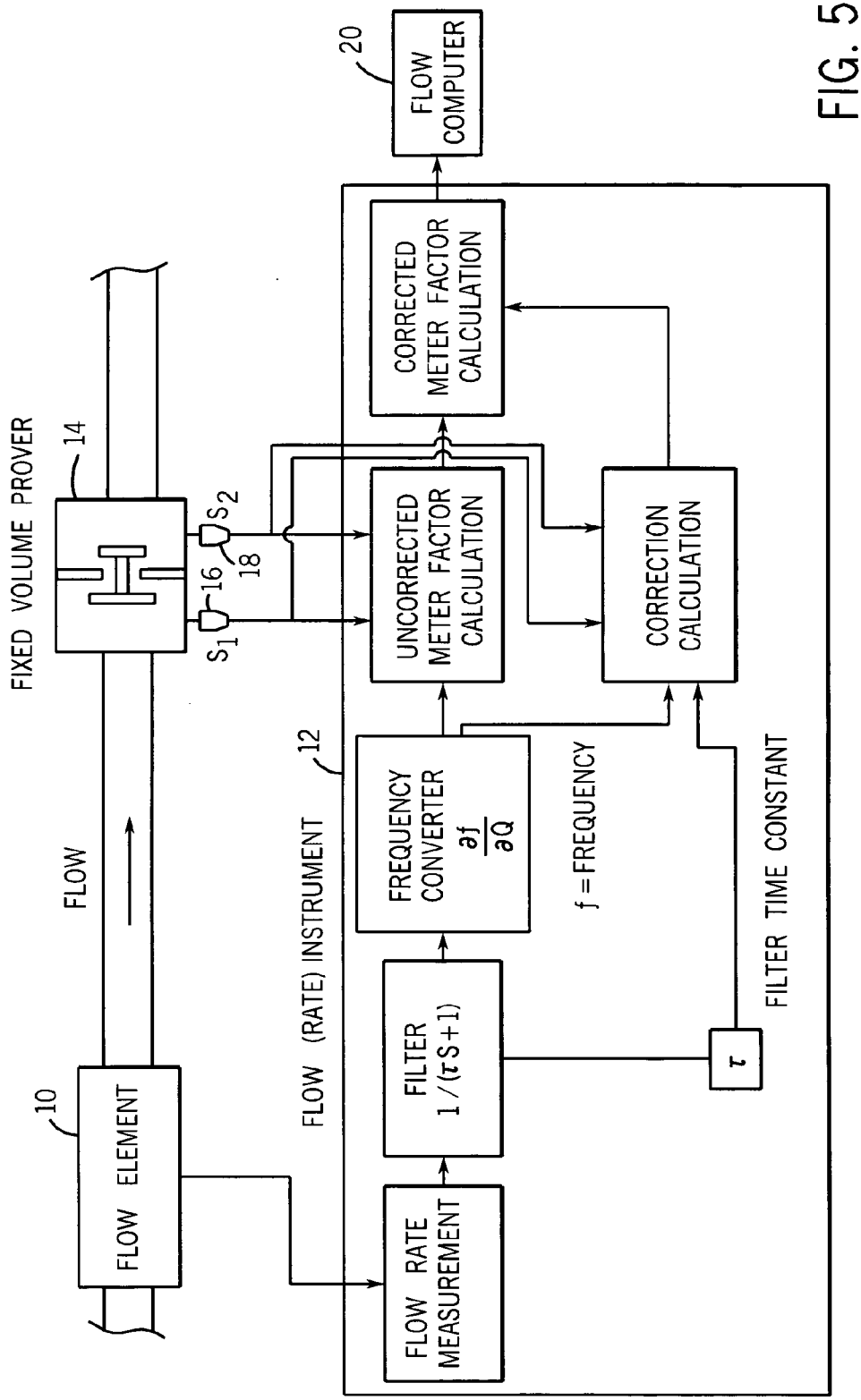
FIG. 5 is a block diagram of a second embodiment of the present invention.

As a second arrangement, if the prover 14 switch actuation signals and prover 14 volume are provided to the meter manufacturer, the meter factor computation, including the correction, can be carried out in the meter itself. A diagram of this embodiment is shown in FIG. 5. For this arrangement, correction of meter factor data to standard temperature and pressure conditions (S.T.P.) remains in the flow computer 20 as does all custody transfer functions.

Figure 6:
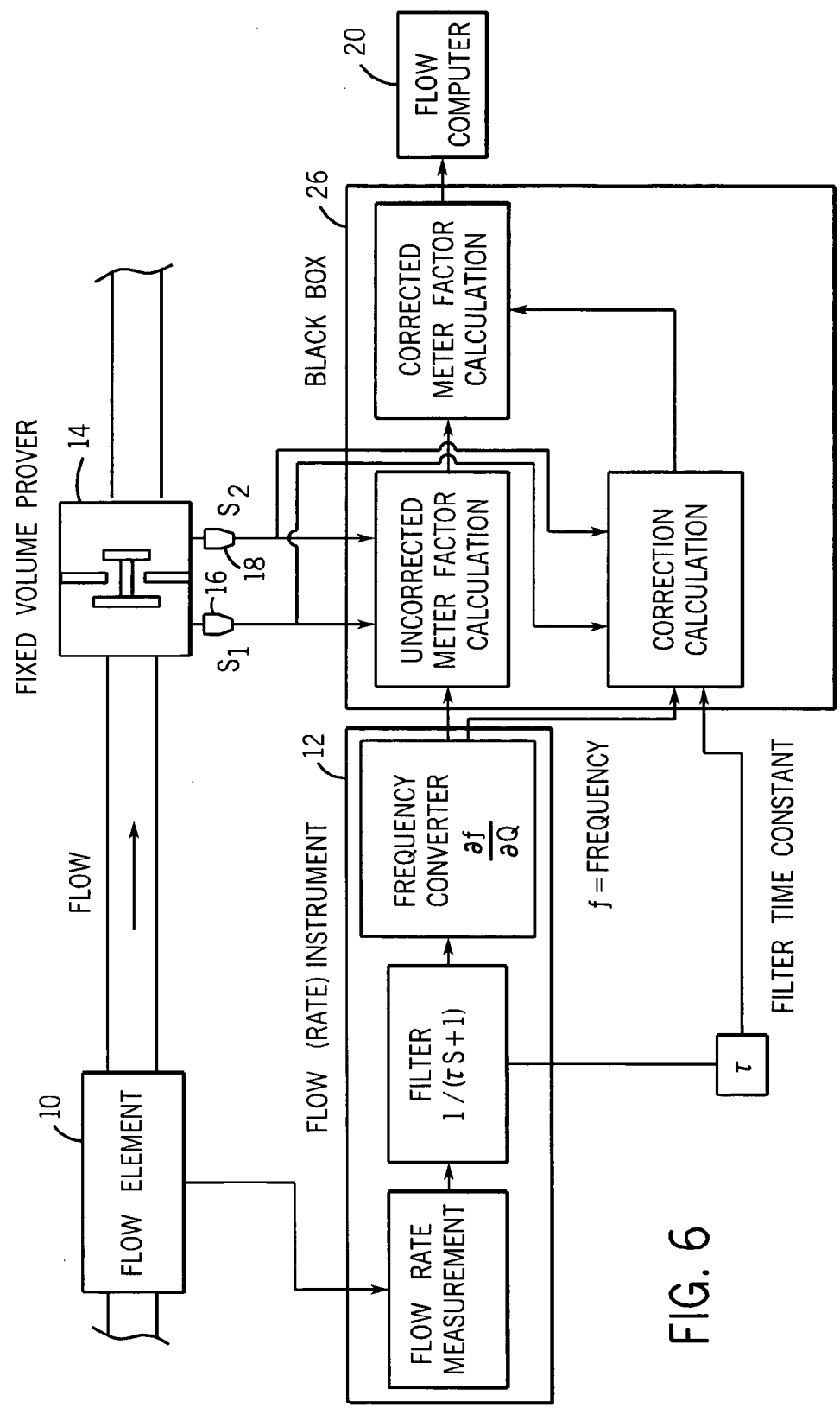
FIG. 6 is a block diagram of a third embodiment of the present invention.
Figure 7:
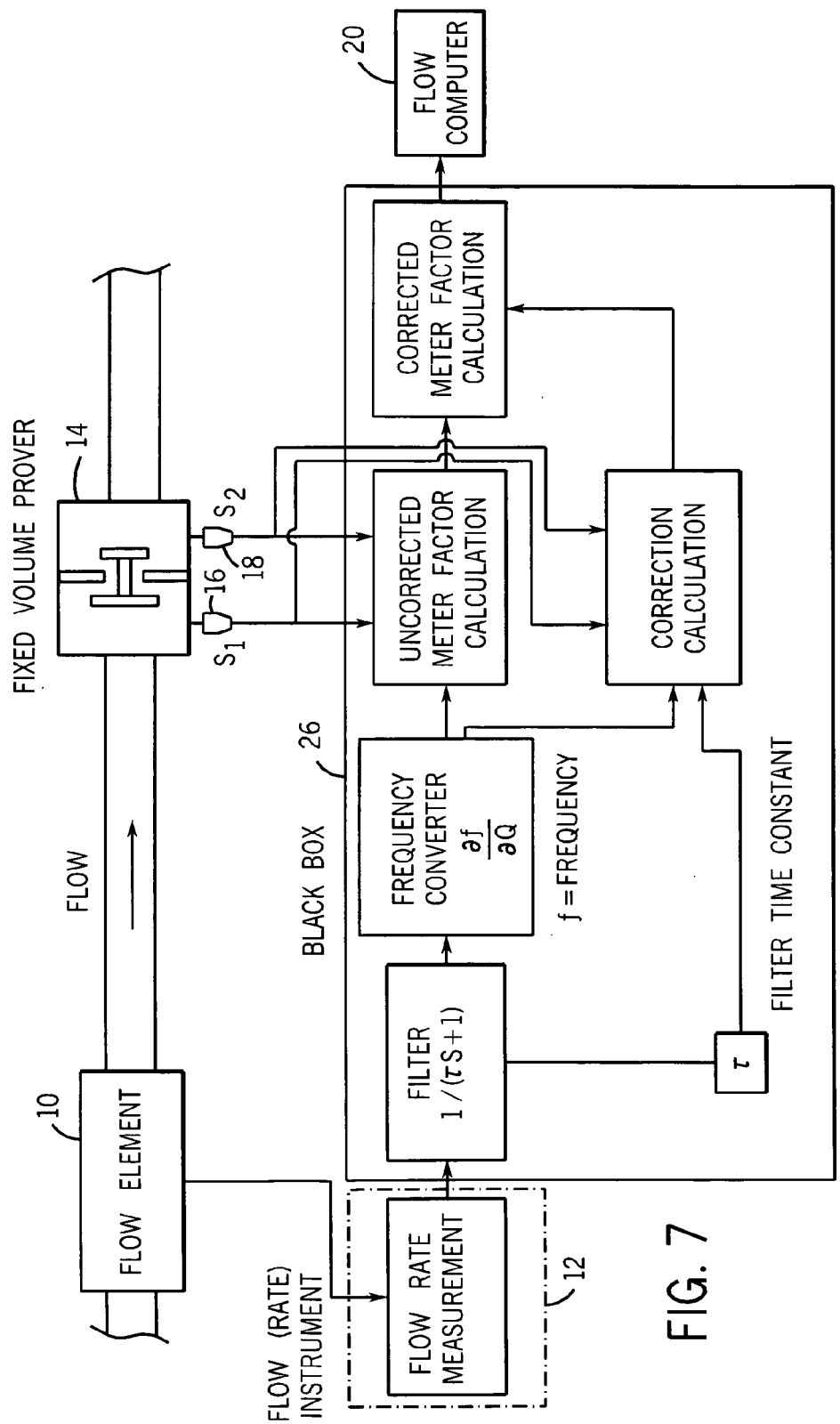
FIG. 7 is a block diagram of a fourth embodiment of the present invention.
Figure 8:
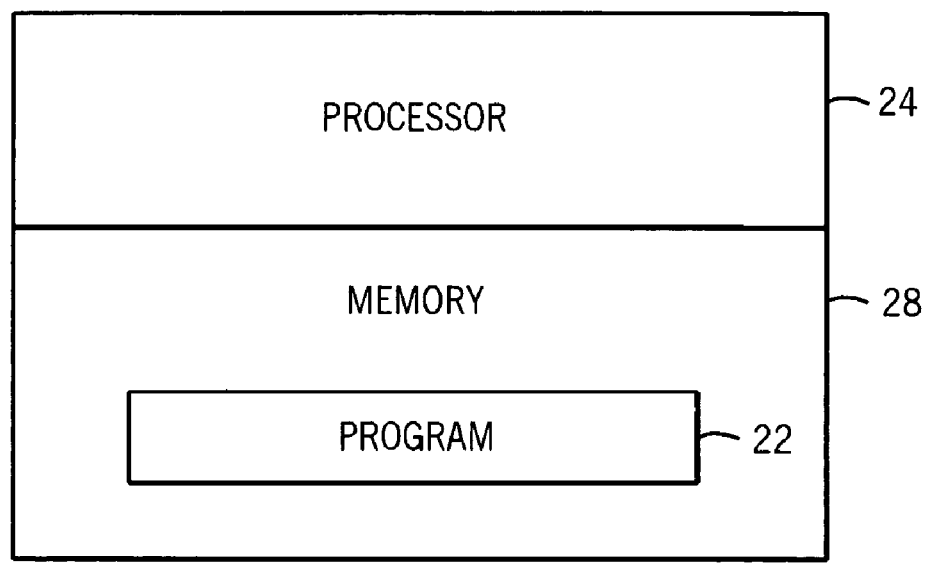
FIG. 8 is a block diagram of the present invention.

A third arrangement employs a separate "black box", which is supplied with the pulse train from the meter to be calibrated along with the instantaneous pulse train frequency, $\tau$, and the prover 14 switch actuation signals. The black box performs the meter factor calculation which is fed to the flow computer 20. A diagram of this embodiment is shown in FIG. 6. Again correction to S.T.P. and custody transfer functions would remain with the flow computer 20.

A fourth arrangement consists of an ultrasonic or other flowmeter configured to output each sample flow rate it measures, unfiltered, in a continuous data stream to a "black box". The black box:

(a) Filters the flow rate data using a single pole low pass filter or similar, the time constant of said filter being user selectable to enhance the ability to prove the meter in a limited number of proving runs, (b) Converts the filtered flow rate data to a pulse train whose instantaneous frequency is directly proportional to the filtered flow rate, (c) Accept input signals from the actuations of the upstream and downstream prover detection switches 16, 18, (d) Counts the number of pulses between the actuation of the upstream and downstream prover detection switches 16, 18, (e) Records the filtered flow rates at the times of actuation of the upstream and downstream prover detection switches 16, 18, (f) Computes the correction to the pulse count from the [difference in pulse frequencies at the times when upstream and downstream prover detection switches 16, 18 actuate] times [the time constant of the instantaneous flow sample filter], (g) Computes a corrected pulse count as the algebraic sum of the number of pulses counted in (d) and the correction calculated in (f), (h) Computes a meter factor from the quotient of the (input) prover 14 volume and the corrected pulse count as calculated in (g), (i) Transmits same meter factor to a flow computer 20 for use in custody transfer operations.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An apparatus for increasing the accuracy of meter factors of a flow instrument in conjunction with a prover having upstream and downstream prover detection switches and a flow computer, the apparatus comprising a flow instrument having a time constant, and a computer program embodied on a computer readable medium for correcting errors in a meter factor of the flow instrument measured in a proving run produced by flow changes in a proving run.

2. An apparatus as described in claim 1 wherein the flow instrument is either an ultrasonic flow meter or a coriolis or vortex shredding meter.

3. An apparatus as described in claim 2 including a container having a processor and the program.

4. An apparatus as described in claim 2 wherein the flow instrument includes the program.

5. An apparatus as described in claim 2 comprising a flow computer wherein the flow computer includes the program.

6. An apparatus as described in claim 2 wherein the program includes a filter time constant which reduces the number of proving runs required to establish a meter factor within a specified accuracy.

7. An apparatus as described in claim 2 wherein the program is configured to detect flow rate changes prior to or during a proving run, which flow rate change would result in an unacceptable error in the meter factor determined by the proving run, whether or not the effect of the flow rate change is accounted in the meter factor determination.

8. An apparatus as described in claim 2 wherein the program calculates the error produced by a flow rate change, taking into account signal processing, including data filtering, employed by the flow instrument that measures the flow rate.

9. An apparatus as described in claim 2 wherein the program corrects the meter factor obtained by a proving run during which flow rate changes by an amount that, without correction, would lead to an unacceptable error in the meter factor, such that the corrected meter factor has essentially no error.

10. An apparatus as described in claim 2 wherein the program corrects error from a signal indicating a position of the upstream prover detection switch, a signal indicating the position of the downstream prover detection switch, a signal equal to flow rate as measured and filtered by the flow instrument to be proved, synchronized with the actuation of the upstream prover detection switch, a signal equal to flow rate as measured and filtered by the flow instrument to be proved, synchronized with the actuation of the downstream prover detection switch, an input equal to a value of a pulse train frequency/measured flow constant of the flow instrument to be calibrated, and an input equal to the value of a time and a constant of a data filter employed by the flow instrument being proved.

11. An apparatus as described in claim 2 wherein the program corrects error from a signal indicating the position of the upstream prover detection switch, a signal indicating a position of the downstream prover detection switch, an input equal to instantaneous pulse train frequencies synchronized with actuations of the upstream and downstream prover detection switches, an input equal to the value of a pulse train frequency/measured flow constant of the flow instrument to be calibrated, and an input equal to the value of a time and a constant of a data filter employed by the flow instrument being proved.

12. An apparatus as described in claim 2 wherein the program includes an algorithm as follows:

$$N_{mc} = N_m + [\partial f/\partial Q \times (Q_b - Q_a) \times \tau];$$

Here $N_{mc}$ is the number of meter pulses produced during a proving run corrected for the filtering used by an ultrasonic or other meter;

$N_m$ is the integer number of pulses measured during the proving run, as previously defined;

$\partial f/\partial Q$ is a pulse frequency/flow rate constant employed by a meter;

$Q_b$ is flow rate measured by a meter at the instant the downstream prover detection switch 18 is actuated;

$Q_a$ is flow rate measured by a meter at the instant the upstream prover detection switch 16 is actuated;

$\tau$ is a time constant of a single pole low pass filter used to smooth an instantaneous flowmeter output.

13. An apparatus as described in claim 2 including a memory containing the program.

14. A computer program embodied on a computer readable medium whose contents causes a processor to increase accuracy of meter factors of a flow instrument in conjunction with a prover having upstream and downstream prover detection switches and a flow computer comprising the computer implemented steps of:

receiving signals from the upstream and downstream prover detection switches and the flow instrument having a time constant; and correcting errors in a meter factor of the flow instrument measured in a proving run produced by flow changes in a proving run.

15. A method for increasing accuracy of meter factors of a flow instrument in conjunction with a prover having upstream and downstream prover detection switches and a flow computer comprising the steps of:

activating a processor; and correcting errors in a meter factor of a flow instrument having a time constant measured in a proving run produced by flow changes in a proving run by implementing a computer program in a processor.

16. A method as described in claim 15 wherein the correcting errors step includes the step of correcting errors in the meter factor of either an ultrasonic flow meter or a coriolis or vortex shredding meter.

17. A method as described in claim 16 wherein the activating step includes the step of activating the processor in a container.

18. A method as described in claim 16 wherein the activating step includes the step of activating the processor in the flow instrument.

19. A method as described in claim 16 wherein the activating step includes the step of activating the processor in a flow computer.

20. A method as described in claim 16 wherein the correcting step includes the step of correcting errors with the computer program using a filter time constant which reduces the number of proving runs required to establish a meter factor within a specified accuracy.

21. A method as described in claim 16 wherein the correcting step includes the step of correcting errors with the computer program that detects flow rate changes prior to or during a proving run, which flow rate change would result in an unacceptable error in a meter factor determined by a proving run, whether or not the effect of a flow rate change is accounted in a meter factor determination.

22. A method as described in claim 16 wherein the correcting step includes the step of correcting errors with the computer program that calculates the error produced by a flow rate change, taking into account signal processing, including data filtering, employed by the flow instrument that measures flow rate.

23. A method as described in claim 16 wherein the correcting step includes the step of correcting errors with the computer program that corrects a meter factor obtained by a proving run during which the flow rate changes by an amount that, without correction, would lead to an unacceptable error in a meter factor, such that a corrected meter factor has essentially no error.

24. A method as described in claim 16 including the steps of receiving a signal indicating a position of the upstream prover detection switch, receiving by the processor a signal indicating the position of the downstream prover detection switch, receiving by the processor a signal equal to flow rate as measured and filtered by a meter to be proved, synchronized with an actuation of the upstream prover detection switch, receiving by the processor a signal equal to the flow rate as measured and filtered by a meter to be proved, synchronized with the actuation of the downstream prover detection switch, receiving by the processor an input equal to the value of a pulse train frequency/measured flow constant of a meter to be calibrated, and receiving by the processor an input equal to the value of a time and a constant of a data filter employed by a meter being proved.

25. A method as described in claim 16 wherein the program employs an algorithm as follows:

$$N_{mc} = N_m + [\partial f/\partial Q \times (Q_b - Q_a) \times \tau];$$

Here $N_{mc}$ is the number of meter pulses produced during a proving run corrected for the filtering used by an ultrasonic or other meter;

$N_m$ is the integer number of pulses measured during the proving run, as previously defined;

$\partial f/\partial Q$ is a pulse frequency/flow rate constant employed by a meter;

$Q_b$ is flow rate measured by a meter at the instant the downstream prover detection switch 18 is actuated;

$Q_a$ is flow rate measured by a meter at the instant the upstream prover detection switch 16 is actuated;

$\tau$ is a time constant of a single pole low pass filter used to smooth an instantaneous flowmeter output.

* * * * *